United States Patent
Wunderlich et al.

(10) Patent No.: US 12,399,068 B2
(45) Date of Patent: Aug. 26, 2025

(54) STATUS MONITORING FOR A ROTATING ELEMENT OF A MOTOR OR WORK MACHINE, MORE PARTICULARLY FOR THE ROTOR OF AN ELECTRIC MOTOR

(71) Applicant: PRO-MICRON GMBH, Kaufbeuren (DE)

(72) Inventors: Rainer Wunderlich, Kaufbeuren (DE); Manfred Rietzler, Bangkok (TH)

(73) Assignee: PRO-MICRON GMBH, Kaufbeuren (DE)

( * ) Notice: Subject to any disclaimer, the term of this patent is extended or adjusted under 35 U.S.C. 154(b) by 230 days.

(21) Appl. No.: 18/254,418

(22) PCT Filed: Oct. 27, 2021

(86) PCT No.: PCT/EP2021/079856
§ 371 (c)(1),
(2) Date: May 25, 2023

(87) PCT Pub. No.: WO2022/117265
PCT Pub. Date: Jun. 9, 2022

(65) Prior Publication Data
US 2024/0003757 A1 Jan. 4, 2024

(30) Foreign Application Priority Data

Dec. 2, 2020 (EP) .................................. 20211197

(51) Int. Cl.
*H02K 11/25* (2016.01)
*G01D 5/48* (2006.01)
(Continued)

(52) U.S. Cl.
CPC ............ *G01K 11/265* (2013.01); *G01K 13/08* (2013.01); *H02K 11/25* (2016.01)

(58) Field of Classification Search
CPC .......... H02K 11/25; H02K 21/00; H02K 1/27; H02K 1/32; G01K 11/26; G01K 11/22;
(Continued)

(56) References Cited

U.S. PATENT DOCUMENTS 7,709,998 B2 *  5/2010 Stelzer .................... G01L 23/10
                                                    310/319
2023/0188011 A1 *  6/2023 Sheradin ................ H02K 11/25
                                                    310/68 C

FOREIGN PATENT DOCUMENTS

CN          108768088 A  * 11/2018  ............... G01K 1/02
CN          110346062 A  * 10/2019
(Continued)

OTHER PUBLICATIONS

Bruckner, Gudrun; Wireless Readout of Multiple SAW temperature Sensors; MDPI; Jul. 12, 2019; Carinthian Tech Research; 9524 Vallach, Austria.

*Primary Examiner* — Edgardo San Martin
(74) *Attorney, Agent, or Firm* — Sand, Sebolt & Wernow Co., LPA (57) ABSTRACT

A motor or work machine having a housing part, a stator element, a rotor element with a monitoring device for monitoring a state parameter of the rotor. The monitoring device includes a sensor unit contains a coupling element and a conductor structure, SAW sensor element connecting the aforementioned elements, and a query unit. The query unit preferably operates according to the S-FSCW principle. The unit has a signal generator for generating query signals and a coupling structure. The coupling structure is positioned along an air gap formed between the rotor element and stator element or a section of the housing covered by the coupling element when the rotor element is rotated. The positioning is such that a coupling is enabled between the coupling structure and the coupling element for signal (Continued)

transmission over the air gap. The query unit has an evaluation circuit for evaluating received response signals.

19 Claims, 3 Drawing Sheets (51) Int. Cl.
*G01K 7/32* (2006.01)
*G01K 11/26* (2006.01)
*G01K 13/08* (2006.01)

(58) Field of Classification Search
CPC ...... G01K 11/265; G01K 13/08; G01K 13/04; G01K 7/32; G01K 1/024; G01K 1/14; G01D 5/48; G01D 5/20; H02P 21/14; H02P 23/14; H02P 29/02
See application file for complete search history.

(56) References Cited

FOREIGN PATENT DOCUMENTS

| | | | | |
|---|---|---|---|---|
| CN | 110954238 A | * | 4/2020 | |
| CN | 112968575 A | * | 6/2021 | |
| CN | 115307775 A | * | 11/2022 | ............ G01K 11/265 |
| CN | 117589326 A | * | 2/2024 | |
| CN | 118129935 A | * | 6/2024 | |
| DE | 19844893 A1 | | 4/2000 | |
| DE | 102007063200 A1 | | 6/2009 | |
| DE | 102016112693 A1 | | 1/2018 | |
| DE | 102017207401 A1 | | 5/2018 | |
| DE | 102018211833 A1 | | 1/2020 | |
| DE | 102018213405 A1 | | 2/2020 | |
| DE | 112017008161 T5 | | 9/2020 | |
| DE | 102019215446 A1 | * | 4/2021 | |
| DE | 102022115505 A1 | * | 12/2023 | |
| EP | 1081845 A2 | | 7/2001 | |
| EP | 1798866 A1 | | 6/2007 | |
| EP | 1959532 A1 | | 8/2008 | |
| EP | 2034591 A1 | * | 3/2009 | ............ H02K 11/25 |
| EP | 2351992 A1 | | 8/2011 | |
| EP | 2887511 A1 | | 6/2015 | |
| EP | 2317291 B1 | | 12/2016 | |
| EP | 3171291 A1 | | 5/2017 | |
| EP | 3190697 A1 | | 7/2017 | |
| EP | 3236275 A1 | | 10/2017 | |
| EP | 2933620 B1 | | 4/2020 | |
| EP | 3190697 B1 | | 5/2020 | |
| EP | 3716454 A1 | | 9/2020 | |
| EP | 2894784 B1 | | 5/2021 | |
| FR | 3080724 A1 | * | 11/2019 | ............... G01D 5/48 |
| JP | 7310037 B1 | * | 7/2023 | ............... G01K 1/08 |
| KR | 101799970 B1 | * | 11/2017 | ............ H02K 11/25 |
| WO | 9709596 A2 | | 3/1997 | |
| WO | WO-2014173655 A2 | * | 10/2014 | ............ H02K 11/24 |
| WO | 2020200822 A1 | | 10/2020 | |

* cited by examiner

STATUS MONITORING FOR A ROTATING ELEMENT OF A MOTOR OR WORK MACHINE, MORE PARTICULARLY FOR THE ROTOR OF AN ELECTRIC MOTOR

TECHNICAL FIELD

The invention relates to a status monitoring device for monitoring a state parameter such as the temperature of a rotating element of a motor or work machine, in particular of the rotor of an electric motor, and in particular of a synchronous motor. It also relates to a motor or work machine, in particular an electric motor, having a housing part, with a stator element and a rotor element arranged in the housing part, and having a monitoring device for monitoring a state parameter, such as a temperature, of the rotor element.

BACKGROUND ART

In various applications, in particular in a motor or work machine, rotating elements are arranged within static elements. This applies to work machines such as generators, as well as to power machines such as motors or turbines. A special place is occupied here by electric motors in which rotors are arranged within stators and are driven to rotate about an axis of rotation by appropriately controlled current flow through alternating magnetic fields generated by electrical conductors placed in windings. A particular design of such electric motors are synchronous motors in which the rotors are equipped with permanent magnets. Synchronous motors of this kind are used in particular in the field of electric vehicles, and thus in particular electric automobiles. In particular in this application, the synchronous motors are operated at high power in order in this way to generate strong torques and achieve high accelerations and driving speeds of the electric cars. As is known, a heating of the components of the synchronous motor that occurs at high power consumption of the synchronous motor, in particular the rotor with the permanent magnets arranged therein is problematic. In this case, it is necessary to prevent exceeding a critical temperature of the rotor, since otherwise there is the risk that the permanent magnets will lose their magnetization or even become completely demagnetized, such that the synchronous motor suffers irreparable damage.

However, monitoring of the temperature of the rotor is also important in asynchronous motors. In particular, it is desirable to be able to know and monitor the temperature of the short-circuit windings in the rotor.

In general, if the knowledge of the temperature of the rotor of a motor or work machine is also important for other reasons, it is desirable to be able to know and monitor this temperature as precisely as possible: Thus, excessively high temperatures can damage the elements following the axis of the rotor element, and in particular the bearings. For example, grease can decompose in a bearing starting at, for example, approximately 150° C., which leads to a loss of bearing lubrication and thus to the risk of damage to the bearing. Furthermore, if the rotor is hot while the stator element is still significantly colder, there can be excessive pressure on the balls in the bearing, causing very high wear.

In general, a temperature increase leads to a linear expansion, which can also impair the functioning of other components and, for example, in the case of spindle motors in cutting machines, can cause the accuracy of the machining to be impaired. Given a length expansion of 10 ppm/K and an assumed axis length of 100 mm, a change in temperature by 10 K results in a change in length of 10 μm. Knowing and predicting this change in length through an accurate knowledge of the temperature is of great advantage, if not required, in various applications.

The problem of monitoring the temperature of rotors in synchronous motors is also already addressed in the prior art. Here, however, the rotor temperature is not measured directly, but is typically estimated indirectly in an approximation based upon simulation or extrapolation. Examples of such methods and procedures are described in EP 3190697 A1 and also in DE 10 2017 207 401 A1. Even if this methodology already enables a usable determination of the rotor temperatures, it cannot, however, be used to determine the actual temperature at the rotor exactly. Accordingly, in power control systems for synchronous motors operating with this methodology, a certain safety buffer for the temperature is always calculated in, and thus the synchronous motor is typically operated with a maximum power set below a theoretically achievable maximum power in order to take into account an error given for the indirect determination method of the rotor temperature and thereby to ensure that a critical rotor temperature at which the demagnetization processes described above can occur is not reached or ever exceeded under any circumstances.

EP 2351992 A1 discloses a system in an electric motor in which the rotor temperature can be determined and read out wirelessly using SAW technology. The query is based upon the FMCW principle (frequency-modulated continuous wave) and accordingly requires a precise position detection of the rotor relative to the stator in order to carry out the queries in a geometric position in which there is a sufficiently good signal connection between the sensor unit and the query unit.

In addition to the temperature of the rotor element of a motor or work machine, such as an electric motor or a turbine or a generator, it is often also of interest or even essential to know the state values of other state parameters, such as the value of an applied torque, and to also be able to monitor these state parameters in situ and to measure the state value thereof directly at the rotor element.

Based upon this known prior art and against the background of the described problem, it is an object of the invention to specify a possibility of determining the state value of a state parameter, such as in particular the temperature, of rotating elements, in particular in motor or work machines, by means of direct measurement, and a sensor system enabling this, also in an electric motor, for determining the state value of the state parameter, such as for example the temperature, of the rotor element.

SUMMARY OF THE INVENTION

This problem and this object are addressed by the present invention, with which a solution is specified which permits a monitoring of a state parameter, such as in particular the temperature, of a rotating component, in particular the monitoring of the temperature of the rotor element of a motor or work machine, in particular of the rotor of an electric motor, in the form of an actual determination of the temperature value by measurement. Advantageously, this measurement and determination should be robust with respect to the environmental conditions, should be reliably possible even at high rotational speeds of the rotating element, and should preferably function even without an exact synchronization of the query with a rotational position of the rotating element.

For this purpose, a first aspect of the invention specifies a motor or work machine, such as in particular an electric motor, having a housing part, e.g., a motor housing, having a stator element and a rotor element and having a monitoring device for monitoring a state parameter, in particular a temperature, of the rotor element, wherein the monitoring device comprises a sensor unit and a query unit, wherein the sensor unit is arranged on the rotor element and has at least one SAW sensor element, based upon the principle of surface waves, for detecting a state value of the state parameter, a coupling element, and a conductor structure connecting the SAW sensor element and the coupling element for transmitting analog electromagnetic signals, and wherein the query unit has a signal generator for generating query signals, a coupling structure connected to the signal generator and arranged on the stator or on a section of the housing part facing the rotor element, and an evaluation circuit for evaluating response signals received from the sensor unit, wherein the coupling structure is arranged in a region which, along an air gap formed between the rotor element and the stator element or the section of the housing part, correlates with a region covered by the coupling element when the rotor element rotates, in such a way that a coupling is enabled between the coupling structure and the coupling element for signal transmission across the air gap. Advantageous developments of a motor or work machine designed in this way are that the SAW sensor element may be a SAW sensor element operating according to the runtime delay principle; the query unit may be a query unit operating according to the S-FSCW principle, and the motor or work machine may be a synchronous motor having permanent magnets arranged on the rotor element. In the motor or work machine, the coupling element may be arranged on a surface situated at an axial end of the rotor of the rotor element. The coupling element and the coupling structure may be positioned such that a coupling between the coupling element and the coupling structure can be achieved, and evaluable signals can thus be received, over a largest possible range of angular rotation of the rotor element relative to the stator element. The sensor unit may have an axially elongated shape and may be arranged at least partially recessed in a bore in the rotor element in such a way that one or more SAW sensor element(s) may be arranged in the interior of the bore, and the coupling element may be exposed on the surface of the rotor element. The sensor unit may have a SAW temperature sensor element and may be embedded in the bore in a material, particularly in a pasty material which has a high thermal conductivity and which effects an anchoring of the sensor unit in the bore. The air gap between the rotor element and the stator element or the section of the housing part may have a dimension of 20 mm or less, and in particular of 15 mm or less. The query unit, in particular the query unit's coupling structure, and the coupling element of the sensor unit may be set up and matched in such a way that a short-range communication determined primarily by the temporally changing magnetic field may take place between the query unit and the sensor unit. In the motor or work machine a synchronization of the query unit occurs with the rotation of the rotor element in such a way that the query unit may repeatedly perform a query of the sensor unit in the course of at least two rotations of the rotor element at a determined frequency point, wherein the querying of the sensor unit at the determined frequency point takes place at the same rotational angle position of the rotor element relative to the stator element. In a further aspect, the invention also specifies a monitoring device for monitoring a state parameter, in particular a temperature, of a rotating element, in particular of the rotor element of a motor or work machine, such as for example the rotor of an electric motor, and in particular a synchronous motor, having a sensor unit and a query unit, wherein the sensor unit has at least one SAW sensor element, based upon the principle of surface waves, for detecting a state value of the state parameter. The monitoring device further includes a coupling element and a conductor structure connecting the SAW sensor element and the coupling element for transmitting analog electromagnetic signals. The query unit may have a signal generator for generating query signals, a coupling structure connectable to the signal generator, and an evaluation circuit for evaluating response signals received from the sensor unit. The sensor unit may be formed elongated in an axial direction with the coupling element at a first longitudinal end of the sensor unit and the SAW sensor element at a second longitudinal end situated opposite the first longitudinal end of the sensor unit, and between them the conductor structure connecting the coupling element and the SAW sensor element in the longitudinal direction. Developments of such a monitoring device are that the query unit may be a query unit operating according to the S-FSCW principle. The coupling element, the conductor structure, and the SAW sensor element may be arranged and/or formed on a common substrate. The SAW sensor element may be a SAW sensor element operating according to the runtime delay principle. The monitoring device may contain exactly one query unit and at least two, in particular more than two, sensor units which can be queried by the query unit and can be evaluated separately in their responses.

According to the invention, a motor or work machine with a housing part and with a stator element and a rotor element each arranged in the housing part has a monitoring device for monitoring a state parameter, such as a temperature or also an applied torque, of the rotor element. This monitoring device comprises a sensor unit and a query unit. The sensor unit is arranged on the rotor element. The sensor unit contains at least one SAW sensor element, based upon the principle of surface waves, for detecting a state value of the state parameter, a coupling element, and a conductor structure connecting the SAW sensor element and the coupling element for transmitting analog electromagnetic signals. Here, the sensor unit can in particular also comprise more than one SAW sensor element, wherein these several SAW sensor elements can then be connected in particular to one and the same coupling element via corresponding conductor structures. The query unit includes a signal generator for generating query signals. A coupling structure is connected in terms of signaling to this signal generator, wherein this coupling structure is arranged on the stator element or on a section of the housing part facing the rotor element, and specifically in a region which, along an air gap which is formed between the rotor element and the stator element or the section of the housing part, correlates with a region covered by the coupling element when the rotor element is rotated, in such a way that a coupling is enabled between the coupling structure and the coupling element for signal transmission. The query unit, finally, has an evaluation circuit for evaluating response signals received by the sensor unit. The above-described arrangement of the coupling structure can, for example, be situated opposite, but does not necessarily have to be. An arrangement is preferably selected here which enables a coupling and signal transmission between the coupling structure and the coupling element over the largest possible angle of rotation between the rotor element and the stator element.

An essential aspect of this solution according to the invention is that at least one SAW sensor element is used for a direct measurement of a state value of a state parameter, such as for example the temperature, of the rotor element. On the one hand, this type of sensor is robust and can also be used under more difficult conditions, such as for example at high rotational speeds, such as are achieved in many motor or work machines, e.g., in electric motors, turbines, or fast-running generators (speeds of, for example, up to 20,000 RPM in electric motors). Furthermore, extremely high magnetic fields, magnetic field gradients, and extremely fast temporal changes of the magnetic field prevail in the interior of electric motors, but also in generators. While these boundary conditions are in any case extremely challenging for such electronic circuits as are otherwise typically used in sensors, often even precluding their use altogether, SAW sensor elements can be used even under these extreme conditions and can reliably measure the state values of state parameters to be monitored.

As already mentioned, the SAW sensor element can in principle be configured for measuring a state value of any state parameter to be measured with such a sensor element, for example, for measuring a force, a torque, or even for measuring a temperature. For the measurement of a temperature, the SAW sensor element can then also be referred to as a SAW temperature sensor element. Analogous designations can be selected for SAW sensor elements for monitoring other state parameters.

In a simplest case, the conductor structure which connects the coupling element to the SAW sensor element can be a direct electrical connection between the coupling element and the SAW sensor element, for example, a solder joint at which electrical connections of the coupling element are soldered to electrical contacts of the SAW sensor element. However, the conductor structure can also be a spatially extended element which is arranged between the coupling element and the SAW sensor element. The high-frequency properties of this conductor structure must then be adapted to the coupling element in order to be able to transmit high-frequency signals, e.g., at a frequency of 2.4 GHZ, which can typically be used to query the SAW sensor element and excite or couple in surface waves there, from the coupling element to the SAW sensor element and also from there back to the coupling element. In addition, the conductor structure must also be matched to the SAW sensor element so that there the electromagnetic signal transported via the conductor structure can be converted into a surface wave, and thus the returning surface wave can there again lead to the feeding of a high-frequency electromagnetic signal into the conductor structure. With a clever choice and design of the conductor structure, it may even be possible to improve the high-frequency properties of the entire sensor unit, i.e., the connected system of coupling element, conductor structure, and SAW sensor element.

SAW sensor elements can also be miniaturized to a large extent so that they can be arranged comparatively easily on a rotor element, such as the rotor of an electric motor, the blades of a turbine, or even the rotor of a generator. In particular, it is also possible to arrange the SAW sensor element or elements in recessed fashion in the solid material of the rotor element, for example, in a bore driven into the body of the rotor element starting from its surface. For example, bores or other openings in such a rotor element that are already present in the production process can be used as a receptacle for the SAW sensor element(s). By means of such a recessed receptacle, on the one hand a measurement of a state value, such as, for example, a temperature, can be carried out in even more targeted fashion in a sensitive region, and also in several sections with the use of several SAW sensor elements, while on the other hand the SAW sensor element(s) is/are protected when arranged in such a bore and do not have to be particularly secured against, for example, centrifugal forces that may occur during rotation of the rotor element. Since rotor elements of motor or work machines, such as for example the rotor of an electric motor, typically consist of a metallic material which shields electromagnetic radiation, the coupling element is to be arranged in the region of the surface of the rotor element. In the case of a preferably recessed arrangement of the SAW sensor element in a bore, the distance extending into the bore between the coupling element and the SAW sensor element(s) is bridged by the conductor structure(s), then just formed as an independent component and not created only by a simple electrical connection, possibly supported by a carrier on which the components of the sensor unit are arranged. The conductor structure(s) is/are in this case, as already mentioned above, configured and adapted to conduct electromagnetic signals of the query frequency received from the coupling element, which can for example be in the range of the frequency band of 2.4 GHZ, from the coupling element to the SAW sensor element(s) and also to transmit the signal response of the SAW sensor element/the SAW sensor elements to the coupling element for wireless transmission of this response to the coupling structure.

If the sensor unit is fixed in a bore, then, if it is to be used for monitoring a temperature of the rotor element, it can have one or more SAW temperature sensor elements, and can be embedded in the bore in a material, in particular curable and paste like, which has a high thermal conductivity and which effects an anchoring of the sensor unit in the bore. In this way, a firm hold of the sensor unit on the rotor element is brought about even at high rotational speeds and against the occurring forces, and at the same time an increase in the measurement accuracy of the temperature is achieved, since the temperature at the rotor element is forwarded very well to the SAW temperature sensor element(s) embedded in the material having the high thermal conductivity. In particular, pasty fillers or adhesives can be used here which, on the one hand, are capable of holding the sensor unit in the bore in such a way that it is firmly seated in the bore even at high rotational speeds of the rotor element and the centrifugal forces that occur, but which, on the other hand, also has a sufficiently high flexibility to compensate for thermal stresses which occur during heating due to the different thermal expansion coefficients of the material of the rotor element and the material of the sensor unit, in particular of the crystal material of the SAW sensor element or elements, and thus to prevent in particular the SAW sensor element(s) from being damaged.

The term, "high thermal conductivity," here means that the material significantly improves the heat transfer from the material of the rotor element to the SAW temperature sensor element(s), compared to a state without such a material. For this purpose, the material preferably used here has a significantly higher thermal conductivity than air (whose conductivity is about 0.024 W/mK), and preferably has a thermal conductivity of 1 W/mK or more in the relevant temperature range of the operating temperatures.

Since the coupling structure of the query unit can also be realized in a small size, it can be arranged in a relatively narrow space and region of a narrowly-dimensioned air gap, which can have for example a dimension of 20 mm or less, in particular 15 mm or less, and possibly even less, such as 7 mm or less, or even down to only 2 mm, in a position situated opposite a region covered by the coupling element when the rotor element rotates, and can here form a communication between the query unit and the sensor unit via a wireless signal transmission between coupling structure and coupling element, without, for example, impairing the structure and function of the electric motor here.

Thus, with the technology as described above and the particular design of the motor or work machine, such as an electric motor, with the sensor technology described, a state value of a state parameter, such as the temperature, of the rotor element can be measured directly, so that there is no need to make use of an approximate determination based upon calculations and simulations. Accordingly, if, for example, in the case of a temperature measurement, the error window of the determined temperature is significantly smaller, so that, for example, an electric motor equipped in this way can be operated at higher power in the limit range, a reduction in the power when a critical temperature is reached has to take place only when this temperature is actually measured, and not before that, with inclusion of a safety buffer due to the inaccuracies of an indirect temperature estimation by simulation and computational derivation from other determined parameters. The inventors assume here that it is possible to operate an electric motor constructed in accordance with the invention in a range of up to 10% above the upper power limit of such models, which rely on the indirect methods of a simulation, or computational, indirect determination, for the temperature determination.

In principle, the SAW sensor element of the sensor unit can be according to any of the two known principles of the resonator or the SAW sensor element operating according to the propagation delay principle (so-called delay line SAW). However, the inventors have found that SAW sensor elements of the second-named design and manner of functioning are particularly well suited for implementing the invention.

Particularly advantageously, the query unit can be one that operates according to the S-FSCW (switched-frequency stepped continuous wave) principle. This principle is described, for example, in the article, "Wireless Readout of Multiple SAW Temperature Sensors," by authors Gudrun Bruckner and Jochen Bardong, published in Sensors 2019, 19, 3077, and further explained in the book, "Surface Acoustic Wave Devices in Telecommunications," by Hashimoto, K., published by Springer Verlag, Berlin, Germany, 2000, also referenced in said article. A query according to this principle is more time-consuming in comparison with other query methods, such as the FMCW already mentioned above. However, the inventors have found that, in the application according to the invention, in order to achieve adequate signal quality of the queried response signal, it is not necessary, as in the prior art, to precisely determine the position of the rotor element with the sensor element fixed thereto, or the coupling element, in order to undertake a query which is synchronized in this respect. Instead, the query can take place over a much wider angular range; in the ideal case, if reflected signals can be used, even more than 360°, i.e., in any rotational position of the rotor element. The inventors have also found that usable signal responses are possible even with an unfavorable signal-to-noise ratio, at which reading out the sensor element with a query according to the FMCW principle is no longer possible. This also contributes to the fact that a query with the S-FSCW principle preferably used here is possible over a wider angular range of the relative position between the rotor element and the stator element. Furthermore, with the S-FSCW, due to the stepped query, possible echoes in the system, such as are caused for example by metallic environments and the signal reflections occurring there, can be suppressed by determining wait times between the radiations and the respective reception accordingly, such that in these times echoes have at least largely decayed.

The use of the S-FSCW principle also makes it possible to respond to possible radio interference signals by, for example, simply skipping over the critical frequencies in the stepped query and transmitting no query pulses at these frequencies. The targeted, repeated transmission/reception of individual selected frequencies is also possible with this principle. Another advantage of the principle preferably selected is the possibility of constructing the query electronics with comparatively inexpensive standard components, such as those used in conventional WLAN technology. This then also applies to the downstream signal processing in the query unit.

The query unit can in particular be designed as described in EP 3171291 A1 and can operate according to the principle disclosed therein.

Even though, with regard to the implementation of the invention in an electric motor, in principle, the determination of just the rotor temperature can be of importance in various possible forms of electric motors, both asynchronous motors and synchronous motors, this is of particular importance in synchronous motors having permanent magnets arranged on the rotor. This is because an excessively high rotor temperature can, as already explained above, lead to partial or complete demagnetization of the permanent magnets on the rotor, and thus to irreversible damage and failure of the motor. Particularly for such synchronous motors, which are currently used in the field of electric cars, a design according to the invention is particularly advantageous, allowing a more precise power control of the electric motors and operation of these synchronous motors further into the limit range of a maximum power, so that a higher power can be obtained from synchronous motors of the same design, or synchronous motors of a different and simpler design, which are typically less expensive, can also be used to achieve a specified power. So that demagnetization of the permanent magnets starts at the highest possible temperatures, alloys with extremely rare and very expensive rare earths are used in the permanent magnets installed in electric motors. By means of a more accurate knowledge of the actual rotor temperature, as the invention enables, either the power can now be increased for the electric motor with the same permanent magnets, or the same power can be achieved with permanent magnets that are formed from other alloys and are thus lower in cost.

In addition to monitoring the temperature, the monitoring of other state parameters can also be of great advantage particularly in a synchronous motor.

For the arrangement of the sensor unit, it is particularly advantageous if it is mounted in such a way that the coupling element is arranged on a surface situated at an axial end of the rotor. The coupling structure of the query unit is then usually arranged on an end-face housing element, e.g., a housing cover, of the motor or work machine, such as an electric motor. The inventors have found that such an arrangement also enables a wireless communications connection between the coupling structure of the query unit and the coupling element of the sensor unit over a wide rotational range of the rotor, in many cases, in a range of 270° or even higher, in particular when this is connected in combination with the selection of the S-FSCW principle for the query unit. Such a wide range of rotation in which the query is possible is advantageous because the transmission of the query signal up to the receipt of the response signal should, and ideally must, take place in a time window in which a wireless connection between the coupling structure and the coupling element is continuously maintained. Particularly at high rotational speeds, such a time window is only sufficiently large if the connection between coupling structure and coupling element is ensured over a wide rotational angle of the rotor. In the arrangement of coupling element and coupling structure as explained above, it can be advantageous if they are arranged at a substantially identical radial distance to the axis of rotation of the rotor element. In many cases, in this way, an optimal coupling between the coupling structure and the coupling element can be further supported. Depending upon the structure and geometry of the environment in which the elements involved are arranged on the stator element and the rotor element, and also depending upon whether, if applicable, several sensors are provided which are to be queried by the query unit, other arrangements with a deviating radial distance from the axis of rotation can also be advantageous, in particular if these enable a particularly good coverage of a query, possible with a good signal response, over a wide angular rotation range of the rotor element.

Particularly since, in the motor or work machine according to the invention, such as an electric motor, the air gap can have a small height extension, as already mentioned above, a dimension of 20 mm or less, in particular of 15 mm or less, and even down to very small distances of 1 to 2 mm, the query unit, in particular its coupling structure, and the coupling element of the sensor unit can be set up and matched in such a way that a short range communication between the query unit and the sensor unit, which is primarily determined by the temporally changing magnetic field, takes place. This is because the distance between coupling structure and coupling element formed by the air gap is typically not so large here that complete electromagnetic waves of a typical radio communication can be formed, but, rather, a near-field coupling can be observed and must be used, which is advantageously determined by the magnetic field (B field). In this respect, coupling element and coupling structure are here preferably also not designed as antennas in the conventional sense, but are optimized for a near-field transmission as described above. In particular, this also allows the components coupling element and coupling structure to be formed with a small overall size and compact design, which is what makes it possible to arrange them in a tightly-dimensioned air gap.

Especially when high rotational speeds are to be achieved, it can then be expedient for a synchronization of the query unit with the rotation of the rotor element to be carried out in the motor or work machine according to the invention in such a way that the query unit performs a query of the sensor unit while the coupling element is located in a region in which it can couple with the coupling structure. Such a synchronization can be carried out in a manner known per se, especially since, in typically known motor or work machines, such as in particular in electric motors, and thus in particular in synchronous motors, the angular position of the rotor element is monitored anyway or can be determined from signals and information which are already being retrieved.

The query method according to the S-FSCW principle used in the context of the invention detects data with a larger number of frequency points of different frequencies, e.g., at 600 such frequency points. However, in order to obtain a usable result of the transformation that is then to be carried out between frequency and time, e.g., a Fourier transformation, not all acquired frequency points are required. By a spatial assignment of the measurement at a certain frequency point to a certain angular position, e.g., detected or acquired by a position sensor or an angular position sensor, and with repeated measurements at the same frequency at the same angular position during several rotations, an averaging of the signal response for this frequency point can be carried out, and in this way the information content of this frequency point can be increased. Without a synchronization of the measurement as described above, however, there would be good as well as unfavorable positions for the respective frequency point with repeated measurements at a frequency point at then different angular positions, as a result of which the information content of such a point would remain smaller. If, on the other hand, synchronization and averaging are done, then frequency points with a high information content (strong signal received from the query unit) and those with low signal are obtained. The evaluation method can now preferably take into account the results of frequency points with a strong signal response, e.g., with a higher weighting, and thus lead to a significantly better transformation into the time domain, which is then further evaluated. A prerequisite for this is an arrangement in which, over a wide angular range, there are many positions with an adequate coupling, i.e., a strong signal response, in particular a good signal-to-noise ratio. This procedure then results in a better data situation than in the case of a measurement with only a few such positions with a particularly good coupling with a strong signal response, possibly even better realized than the couplings obtained in the above solution.

Thus, with the method according to the invention, through a combination with a detection of the rotational position of the rotor element relative to the stator element, a sampling frequency or integer multiples of this frequency of an entire measurement run to be performed several times, a so-called frequency sweep, e.g., a measurement of 600 frequency points, can be synchronized with the rotational frequency or integer multiples of this rotational frequency of the rotor element, or each individual frequency point of the repeatedly performed measurement series can be synchronized with a specific rotor angular position.

In principle, it is possible for several sensor units or also several SAW sensor elements to be able to be addressed and queried with a query unit in a single sensor unit via the one common coupling structure. In this respect, it can advantageously be provided in particular that the motor or work machine according to the invention have at least two, and, if appropriate, more than two, sensor units, which are constructed according to the principle described above and operated, and whose coupling elements are each arranged to couple with the coupling structure of the query unit. The query of the several sensor units can then take place via different communications windows. A query via various communications windows can mean, in particular, that the sensor units "respond" with different time delays, e.g., via a different arrangement of the reflectors on the SAW sensor elements and thus different signal runtimes on the SAW sensor elements, so that the response signals can be differentiated and assigned in the time spectrum. Here, it is for example possible to place SAW sensor elements at different locations of the rotor element and to connect them to associated coupling elements via corresponding conductor structures and to form sensor units. For example, coupling elements of different sensor units can be positioned on the same radius of the rotor element at different angular positions, which sensor units extend over different axial lengths and project into the depth of the rotor element, so that the SAW sensor elements of the different sensor units are positioned at different axial positions. In this way, temperature gradients or state value distribution of other state parameters can be determined in the rotor element; for example, temperatures or other state parameters can be determined at different neuralgic points or the like. It is also possible to arrange sensor units with SAW sensor elements in the region of the stator element or of the housing part, to position the coupling element of which in turn such that it can couple with the coupling structure of the query unit. In this way, one or more state parameters of the stator, such as, for example, a stator temperature, or state parameters, such as temperatures, of further elements of the motor or work machine, such as of an electric motor, can also be detected and monitored with one and the same query unit, in order to obtain an even better analysis of the machine, e.g., of the electric motor, during operation and, if necessary, to provide a control option that is based upon still further parameters.

In a further aspect, as mentioned above, the invention specifies a monitoring device for monitoring a state parameter, such as a temperature of a rotating element, in particular the rotor element of a motor or work machine, such as an electric motor, and in particular a synchronous motor. This monitoring device contains on the one hand a sensor unit, and on the other a query unit. The sensor unit is a unit as described above, viz., one which has at least one SAW sensor element, based upon the principle of surface waves, for detecting a state value of a state parameter, a coupling element, and a conductor structure connecting the SAW sensor element and the coupling element for transmitting analog electromagnetic signals. This sensor element is formed as a separate miniaturized component and can be used accordingly, and can be arranged on rotating elements such as, in particular, a rotor of an electric motor or another rotor element of a motor or work machine, such as on a turbine rotor, in particular in recessed fashion in a bore made there. For this purpose, the sensor unit is formed elongated in an axial direction and has the coupling element at a first longitudinal end and the SAW sensor element at an opposite, second longitudinal end, and, between them, the conductor structure connecting the coupling element and the SAW sensor element in the longitudinal direction. The monitoring device according to the invention further includes the query unit, which has a signal generator for generating query signals, a coupling structure connectable to the signal generator, and an evaluation circuit for evaluating response signals received from the sensor unit. Such a monitoring device is, as already mentioned, particularly well-suited for carrying out a monitoring of a state parameter, e.g., a temperature monitoring, of a rotating element, in particular in a motor of a work machine such as an electric motor, and, for this purpose, for being installed or mounted or arranged in the machine, such as the electric motor, in a manner as described above. If the sensor unit comprises more than one SAW sensor element, these are designed in such a way, e.g., by forming and placing resonators or reflectors on the SAW crystal, and are connected to the coupling element via conductor structures in such a way, that a runtime difference of the signal responses results, so that the response signals of the SAW sensor elements can be detected separately.

Particularly advantageously, the query unit can operate according to the S-FSCW principle with the advantages already explained above for the application of this principle.

In the sensor unit of the monitoring device according to the invention, the coupling element, the conductor structure, and the at least one SAW sensor element can in particular be arranged on a common substrate, or these elements can be formed on a common substrate. Such a substrate can in particular be a non-ferromagnetic material, for example, a ceramic, a plastic, or the like. Such a common substrate gives the sensor unit inherent strength and makes it comparatively easy, for example, to countersink the sensor unit in a bore made in a rotating element, in particular a rotor of an electric motor, and to install and fix it there.

Even though SAW sensor elements operating according to the resonator principle are also possible in principle, a SAW sensor element which is a SAW sensor element (delay line) operating according to the runtime delay principle is preferred, as already mentioned above.

The monitoring device can advantageously contain exactly one query unit as well as at least two, in particular more than two, sensor units which can be queried by the query unit and can be evaluated separately in their responses. These sensor units then all have a SAW sensor element, a coupling element, and a conductor structure connecting these two elements. They can all be designed to measure state values of the same state parameter, such as a temperature. However, they can also be aligned for the measurement of state values of different state parameters, such as temperature and torque, so that an evaluation unit can monitor different state parameters with the monitoring device.

BRIEF DESCRIPTION OF THE DRAWINGS

Further advantages and features of the invention will be seen from the following explanation of possible embodiments with reference to the accompanying figures. In the drawings.

DETAILED DESCRIPTION

In the figures, possible embodiment variants of the invention are shown using the example of a realization in an electric motor and are explained in more detail below. It should be emphasized here once again that the invention is not limited to application in electric motors, but can also be used in other systems with rotating elements in which it is necessary to monitor states, such as in particular in other motors or also in work machines, such as in turbines, generators, and the like.

Figure 1:
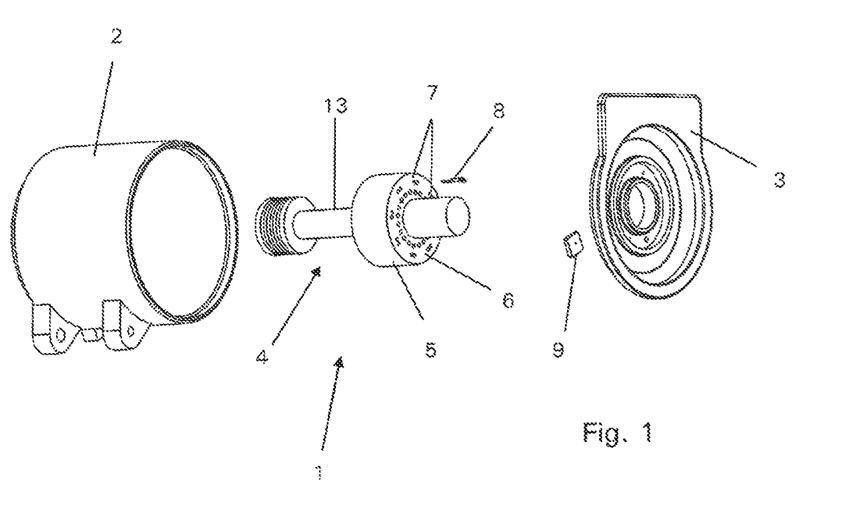
FIG. 1 shows a schematic view of essential components of an electric motor in an exploded view with parts of the monitoring device according to the invention.
Figure 2:
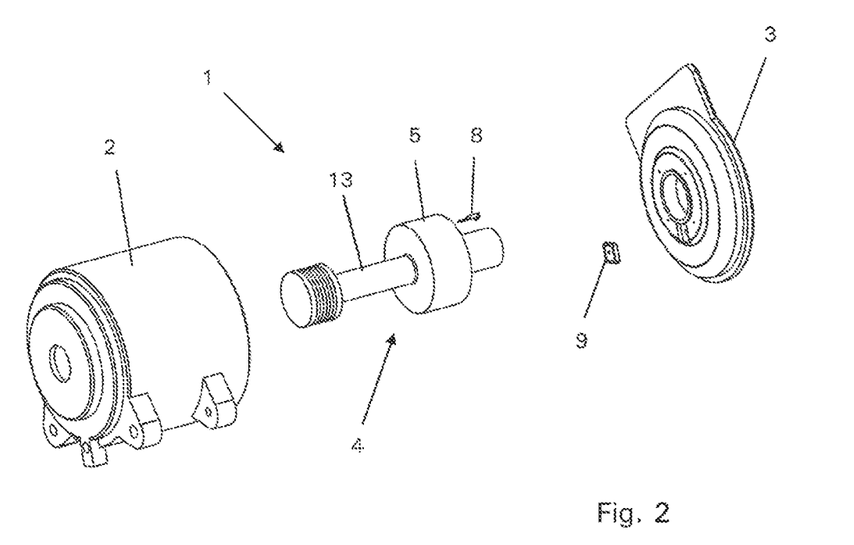
FIG. 2 shows an exploded view comparable to FIG. 1 from another perspective.
Figure 3:
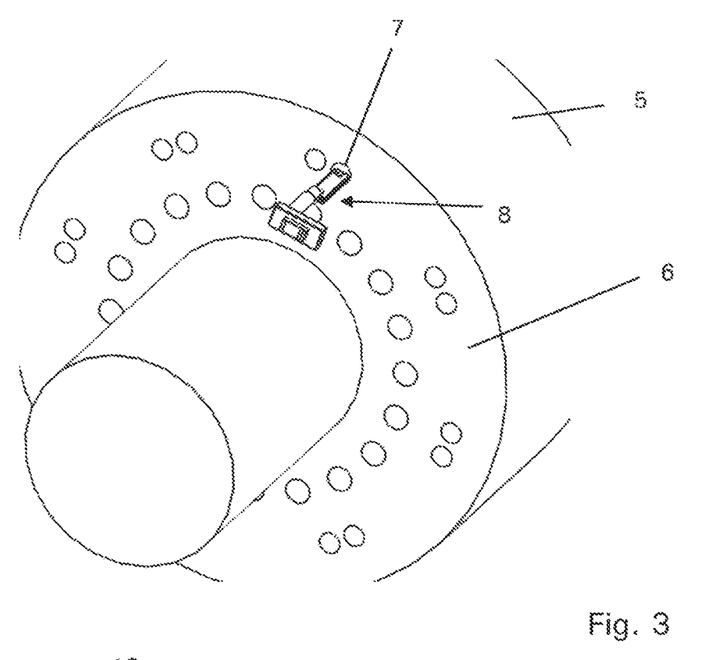
FIG. 3 shows, in an enlarged detail view and exploded, the arrangement of a sensor unit in a bore on an end face of the rotor of the electric motor of FIG. 1.
Figure 4:
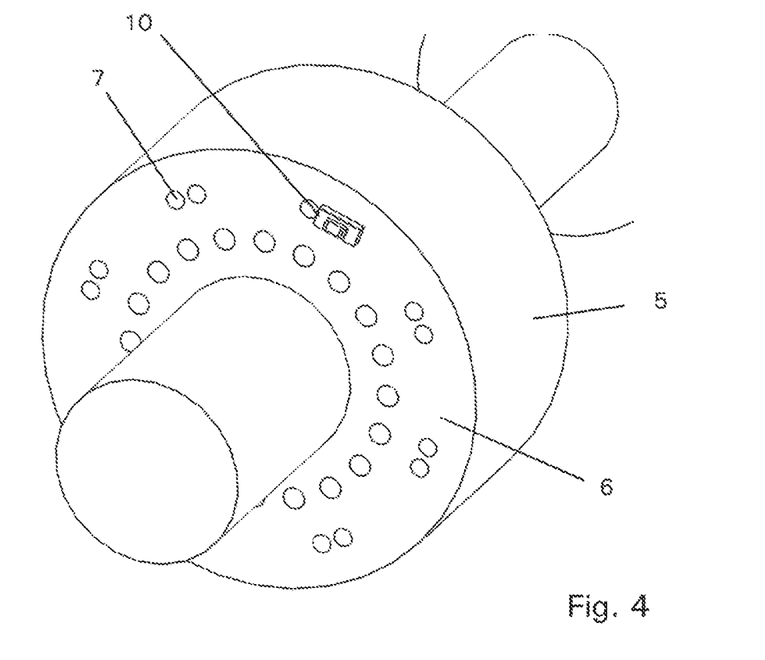
FIG. 4 shows a view comparable to FIG. 3, but with a countersunk sensor unit.

First, FIGS. 1 and 2 show, each in an exploded view, essential components of an electric motor 1 as an example of a work machine to be improved with the invention. Shown are a housing pot 2 which accommodates a stator not shown in more detail, a housing cover 3 which closes the housing pot 2 and together with it forms a motor housing, and a rotor 4 accommodated in the motor housing. The electric motor 1 shown here is in particular a synchronous motor, whose rotor 4 contains permanent magnets not shown in greater detail here. These are arranged or embedded in a rotor body 5. The rotor body 5 has bores 7 extending axially into the rotor body from an end face 6, the openings of which point in the direction of the housing cover 3 in the assembled state of the electric motor 1. A sensor unit 8 is arranged in a (partly) recessed manner in one of the bores 7. A coupling structure 9 of a query unit with its further components, not shown in more detail, is arranged and fixed on the housing cover 3. The arrangement of the sensor unit 8 in one of the bores 7 on the rotor body 5 is shown again in more detail in FIGS. 3 through 5. First, in FIG. 5, the further structure can be seen of the sensor unit 8, which is recessed in the bore 7 over a substantial part of its extension. The sensor arrangement 8 is formed to be substantially longitudinally extended, with a coupling element 10 arranged at a first longitudinal end, a SAW sensor element 11, arranged at a second longitudinal end, which may, for example, be a SAW temperature sensor element used for a temperature monitoring of the rotor, and a conductor structure 12 connecting these two elements, coupling element 9, and SAW sensor element 11. Conductor structure 12 and SAW sensor element 11 are recessed in the bore 7; the coupling element 10 lies outside the bore 7, on the surface of the end face 6. The radial position of the coupling element 10 with respect to a rotational axis 13 of the rotor 4 here corresponds to the radial position of the coupling structure 9 of the query unit, seen with respect to the same axis 13. In the assembled state, a narrow air gap is formed between the housing cover 3 of the electric motor 1 and the coupling structure 9 arranged there and the end face 6 of the rotor body 5 and the coupling element 10 of the sensor unit 8 arranged there, which air gap can, for example, be 10 mm. Over this air gap, a wireless communications link for transmitting analog signals, in particular high-frequency signals, can be formed between the coupling structure 9 and the coupling element 10, in particular a near-field coupling, so that, starting from a query electronics with a signal generator which is connected to the coupling structure 9, a query signal, e.g., one having a frequency of 2.4 GHZ, can be transmitted to the coupling element 10 and from there can be conducted via the conductor structure 12 to the SAW sensor element 11. The SAW sensor element 11 can in particular be one which operates according to the so-called delay line principle and which, with a delay determined by the state value of the state parameter, e.g., by a rotor temperature to which the SAW sensor element is subjected, transmits the signal along the conductor structure 12 back to the coupling element 10, from where it is returned to the query unit via the coupling to the coupling structure 9. From the coupling structure 9, the signal then reaches an evaluation circuit of the query unit, which, from the detected runtime delay, determines a state value of the state parameter at the location of the SAW sensor element 11, e.g., the temperature there. The query unit may in particular be one that operates according to the S-FSCW principle. Through this, as well as through the shown positioning of sensor unit 8, in particular its coupling element 10, and coupling structure 9, and also through a near-field coupling realized here, it is achieved that a coupling between coupling structure 9 and coupling element 10 is maintained over a wide range of rotation of the rotor 4. In particular, this can be 270° or more, so that a signal query from the query unit, in particular via its coupling structure 9, to the sensor unit 8 can be started, and the response signal can be received while the coupling element 10 is in the coupling range with the coupling structure 9.

Figure 5:
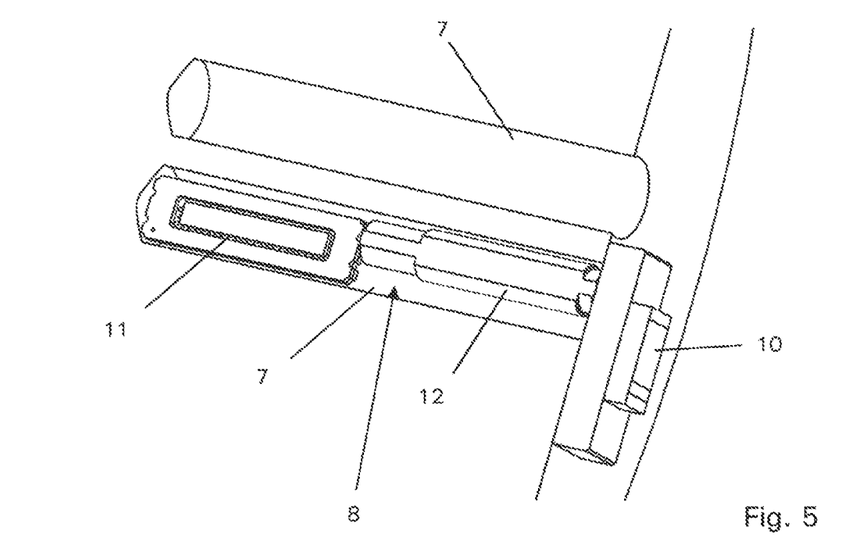
FIG. 5 shows a sectional detail view illustrating the arrangement of the sensor unit in the bore.

With this arrangement, therefore, a state value of a state parameter, e.g., the temperature, of the rotor 4 can be determined with an actual measurement, and this value can subsequently be used for controlling the operation of the electric motor 1, in particular for a power control or power limitation. In the case in which the temperature can be determined more precisely in this way, the electric motor 1 can then be operated further into the limit range up to a maximum permissible temperature without having to include such a widely dimensioned buffer for inaccuracies that arise from the previously standard estimation or simulation of the rotor temperature.

Figure 6:
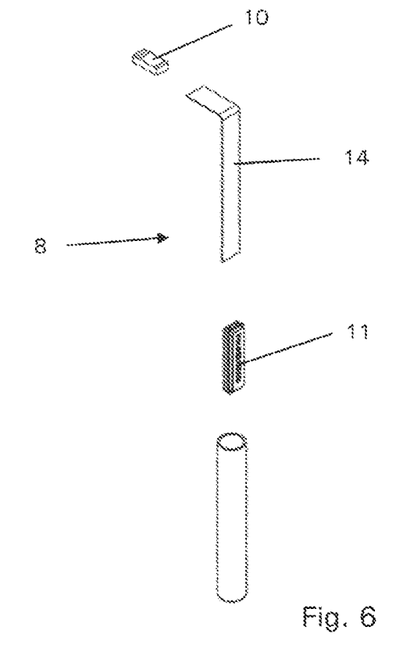
FIG. 6 shows an exploded view of a possible first embodiment variant of the sensor unit.
Figure 7:
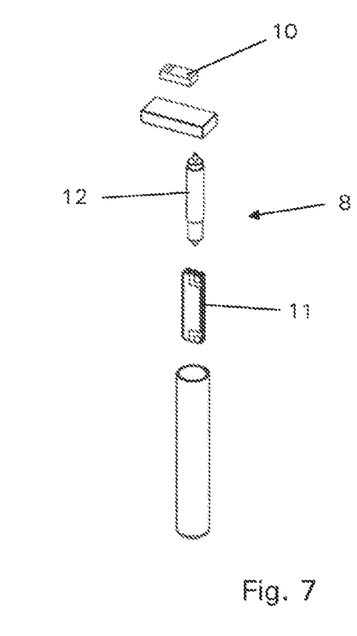
FIG. 7 shows an exploded view of a possible second embodiment variant of the sensor unit.

FIGS. 6 and 7 show two possible variants of how the sensor unit 8 can be formed. In the variant according to FIG. 6, a substrate element 14 is shown on which the SAW sensor element 11, on the one hand, and the coupling element 10, on the other, are fixed and over which the conductor structures, not shown in more detail here, are guided. In this respect, the substrate element 14 carries the electromagnetic signal connection, but also forms a mechanically stable bridge and a holder for the individual elements. In particular, here, the substrate element 14 is made of a non-ferromagnetic material so as not to exert an effect on the rotor and influence the formation of the magnetic fields.

FIG. 7 shows an alternative design in which the conductor structure 12 is designed as a coaxial conductor or waveguide and, in addition to its conductor function, also performs a mechanical stabilization and connecting function. SAW sensor element 11 and coupling element 10 are each connected to the longitudinal ends of the conductor structure 12.

It should be mentioned here that, deviating from the examples shown in the figures, not just one sensor unit 8 can be arranged in the rotor 4, but that two or more of the sensor units 8 thereof can also be arranged in the rotor 4 with an analogous structure, in particular also with a positioning of the SAW sensor elements 11 at different axial depths of the rotor 4, more precisely, of the rotor body 5, in order in this way to carry out measurements of the state values of state parameters, such as temperature measurements, at different positions. These several sensor units can be queried overall with one and the same query unit, in particular via one and the same coupling structure 9, in particular on different communications channels. It is also possible to position corresponding SAW sensor elements 11 on one of the stationary elements, stator and/or housing, or also on a starter winding, and to arrange the coupling elements 10 of the associated sensor units 8 in such a way that they couple with the coupling structure 9 of the query unit and can accordingly be queried and read out by the query unit as well.

It should also be mentioned here that the arrangement of the coupling structure 9 of the query unit does not necessarily have to take place in the housing cover of the electric motor 1. Rather, the coupling structure can also be arranged in a gearbox housing, e.g., if the electric motor 1 is formed in one unit with a gearbox, as is already provided today, for example, for electric motors that are used to drive electric vehicles.

LIST OF REFERENCE SIGNS 1 electric motor
2 housing pot
3 housing cover
4 rotor
5 rotor body
6 end face 7 bore
8 sensor unit
9 coupling structure
10 coupling element
11 SAW sensor element
12 conductor structure
13 axis of rotation
14 substrate element

The invention claimed is:

1. A motor or work machine comprising:
a housing part having a stator element and a rotor element each arranged in the housing part;
a monitoring device for monitoring a state parameter of the rotor element, wherein the monitoring device comprises:
  a sensor unit; and
  a query unit, wherein the sensor unit is arranged on the rotor element and has at least one SAW sensor element based upon a principle of surface waves, for detecting a state value of the state parameter;
  a coupling element; and
  a conductor structure connecting the at least one SAW sensor element and the coupling element for transmitting analog electromagnetic signals; and
  wherein the query unit has a signal generator for generating query signals;
  a coupling structure connected to the signal generator and arranged on the stator or on a section of the housing part facing the rotor element;
  an evaluation circuit for evaluating response signals received from the sensor unit, wherein the coupling structure is arranged in a region which, along an air gap formed between the rotor element and the stator element or the section of the housing part, correlates with a region covered by the coupling element when the rotor element rotates in such a way that a coupling is enabled between the coupling structure and the coupling element for signal transmission across the air gap;
  wherein the signal generator is synchronized with the rotation of the rotor element in such a way that the query unit repeatedly performs a query of the sensor unit in a course of at least two rotations of the rotor element at a determined frequency point; and
  wherein the querying of the sensor unit at the determined frequency point takes place at a same rotational angle position of the rotor element relative to the stator element.

2. The motor or work machine according to claim 1, wherein the SAW sensor element is a SAW sensor element operating according to the runtime delay principle.

3. The motor or work machine according to claim 1, wherein the query unit is a query unit operating according to the S-FSCW principle.

4. The motor or work machine according to claim 1, wherein the motor is a synchronous motor having permanent magnets arranged on the rotor element.

5. The motor or work machine according to claim 1, wherein the coupling element is arranged on a surface situated at an axial end of the rotor of the rotor element.

6. The motor or work machine according to claim 5, wherein the coupling element and the coupling structure are positioned such that the coupling between the coupling element and the coupling structure is achieved, and evaluable signals are receivable over a largest possible range of angular rotation of the rotor element relative to the stator element.

7. The motor or work machine according to claim 1, wherein the sensor unit has an axially elongated shape and is arranged at least partially recessed in a bore defined in the rotor element in such a way that one or more SAW sensor element(s) is/are arranged in an interior of the bore and the coupling element is exposed on a surface of the rotor element.

8. The motor or work machine according to claim 7, wherein the sensor unit has a SAW temperature sensor element and is embedded in the bore in a material which has a high thermal conductivity and which effects an anchoring of the sensor unit in the bore.

9. The motor or work machine according to claim 1, wherein the air gap has a dimension of 20 mm or less.

10. The motor or work machine according to claim 9, wherein the query unit and the coupling element of the sensor unit are set up and matched in such a way that a short-range communication determined primarily by a temporally changing magnetic field takes place between the query unit and the sensor unit.

11. The motor or work machine according to claim 1, wherein the motor or work machine has at least two sensor units each having a SAW sensor element based upon the principle of surface waves, a coupling element, and a conductor structure connecting the SAW sensor element and the coupling element for transmitting analog electromagnetic signals, the coupling elements of said at least two sensor units being arranged to couple with the coupling structure of the one query unit for a signal transmission, and that the query unit is configured to query the at least two sensor units in different communications windows.

12. A monitoring device for monitoring a state parameter of a rotating element having a sensor unit and a query unit, wherein the sensor unit has at least one SAW sensor element, based upon the principle of surface waves, for detecting a state value of the state parameter, a coupling element, and a conductor structure connecting the SAW sensor element and the coupling element for transmitting analog electromagnetic signals, and wherein the query unit has a signal generator for generating query signals, a coupling structure connectable to the signal generator, and an evaluation circuit for evaluating response signals received from the sensor unit, wherein the signal generator of the query unit is synchronized with the rotation of a rotor element in such a way that the query unit repeatedly performs a query of the sensor unit in a course of at least two rotations of the rotor element at a determined frequency point, wherein the querying of the sensor unit at the determined frequency point takes place at a same rotational angle position of the rotor element relative to a stator element, wherein the sensor unit is formed elongated in an axial direction with the coupling element at a first longitudinal end of the sensor unit and the SAW sensor element at a second longitudinal end, situated opposite the first longitudinal end of the sensor unit, and between them the conductor structure connecting the coupling element and the SAW sensor element in a longitudinal direction.

13. The monitoring device according to claim 12, wherein the query unit is a query unit operating according to the S-FSCW principle.

14. The monitoring device according to claim 12, wherein the coupling element, the conductor structure, and the SAW sensor element are arranged and/or formed on a common substrate.

15. The monitoring device according to claim 12, wherein the SAW sensor element is a SAW sensor element operating according to 1 runtime delay principle.

16. The monitoring device according to claim 12, wherein the monitoring device includes exactly one query unit and at least two sensor units which are queried by the query unit and are evaluated separately in their responses.

17. The motor or work machine according to claim 8, wherein the SAW temperature sensor element of the sensor unit is embedded in the bore in a pasty material.

18. The motor or work machine according to claim 10, wherein the coupling structure of the query unit and the coupling element of the sensor unit are set up and matched such that the short-range communication determined primarily by the temporally changing magnetic field takes place between the query unit and the sensor unit.

19. The monitoring device according to claim 12, wherein the monitoring device is configured to monitor the temperature of a rotor of a synchronous electric motor.

\* \* \* \* \*